(No Model.)
S. WATERMAN.
PIN.
No. 559,013. Patented Apr. 28, 1896.
Fig. 2.
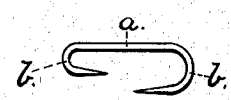
Fig. 1.
Fig. 3.
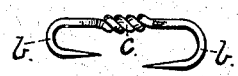
Fig. 4.
Fig. 5.
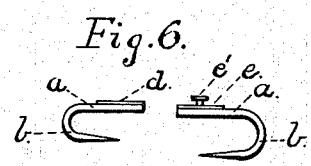
Fig. 6.
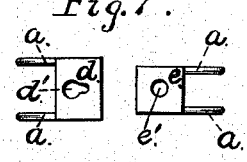
Fig. 7.
Witnesses.
S. J. Murphy
John Henshaw
Inventor.
Stephen Waterman,
per Wilmarth H. Thurston
Attorney.

UNITED STATES PATENT OFFICE.

STEPHEN WATERMAN, OF PROVIDENCE, RHODE ISLAND.

PIN.

SPECIFICATION forming part of Letters Patent No. 559,013, dated April 28, 1896.

Application filed June 6, 1895. Serial No. 551,876. (No model.)

*To all whom it may concern:*

Be it known that I, STEPHEN WATERMAN, of the city and county of Providence, in the State of Rhode Island, have invented a certain new and useful Pin or Fastener; and I do hereby declare the following specification, taken in connection with the accompanying drawings, forming a part of the same, to be a full, clear, and exact description thereof.

My invention has for its object to produce a pin or fastener adapted to attach one article to another or to connect together two portions of the same article, which shall be simple in construction and which may be readily applied and removed.

To that end the invention consists, primarily, of the pin or fastener hereinafter described, and particularly set forth in the claims.

Referring to the drawings, Figure 1 represents a side view, and Fig. 2 a top view, of a pin or fastener embodying my invention. Fig. 3 is a top view of another form of pin; Figs. 4 and 5, side and top views of a pin or fastener provided with two hooks at each end, and Figs. 6 and 7 corresponding views of a pin or fastener made in two parts constructed to be detachably connected together.

The simplest form of my new pin or fastener, and which is represented in Figs. 1 and 2, is formed from a piece of wire $a$ of suitable length sharpened or pointed at each end, with the pointed ends bent inward toward each other, so as to form two oppositely-arranged hooks $b$ $b$. To apply such pin to connect or fasten together two articles or two portions of the same article, one of the hooks $b$ is inserted or hooked into one portion of the material and the other hook inserted or hooked into the portion of the material to be connected therewith. If it be desired to draw the two portions together or toward each other in the act of connecting them, this may be readily done by pulling upon the fastener after one of the hooks has been inserted and prior to the insertion of the other hook.

To facilitate the application of the pin or fastener, one of the hooks $b$ is formed with a somewhat larger bend than the other, as shown in Fig. 1, and, if desired, the points of the hooks may be bent outward or offset in opposite directions, as shown in Fig. 3, or one of the hooks may be formed with a larger bend than the other and the hooks also bent outward or offset in opposite directions.

The fasteners shown in Figs. 4 and 5 are what may be termed "double" fasteners—that is, are provided with two hooks at each end of the fastener. In the form shown in Figs. 4 and 5 this double fastener is formed by taking two of the single fasteners formed from somewhat longer pieces of wire and twisting the body portions thereof together, as at $c$.

If desired, two single fasteners may be secured together in any other suitable manner to form a double fastener—as, for instance, by soldering the body portions thereof together—the hooks at each end being preferably spaced or separated from each other.

The fastener shown in Figs. 6 and 7 is what may be termed a "separable" fastener, the same being constructed in two parts adapted to be detachably connected together. A simple way of constructing such separable fastener is illustrated in the figures referred to, in which two pieces of wire $a$, each provided with a sharpened or pointed end and bent to form a hook $b$, are soldered or otherwise secured to a flat piece of sheet metal $d$, provided with an eye or slot $d'$, as shown in Fig. 7. Two other pieces of wire $a$, likewise formed and bent, but preferably with a larger bend, as shown in Fig. 6, are soldered or otherwise secured to a second piece of sheet metal $e$, provided with a projecting stud $e'$. The piece $e$ is preferably made narrower than the piece $d$, and so that in bringing the two parts of the fastener together the part $e$ will pass between the wires $a$, attached to the part $d$. In employing the separable fastener above described the hooks of one part of the fastener are inserted or hooked into one portion of the material and the hooks of the other part of the fastener inserted or hooked into another portion of the material and the two parts then brought together, and so that the stud $e'$ may be inserted through the slot $d'$ and the parts thereby detachably connected together. This separable or two-part fastener is especially useful where the two articles or the two portions of the same article are to be drawn toward a common central meeting-point before connecting or fastening them together.

All of the above-described forms of pins or fasteners are simple in construction, are adapted to a great variety of uses, and may be quickly and easily applied and removed.

What I claim as my invention, and desire to secure by Letters Patent, is—

1. A pin or fastener having a body portion and oppositely-arranged pointed hooks located on the same side of said body portion, one of said hooks having a larger bend than the other whereby the point of said hook is a greater distance from the body portion, substantially as described.

2. A pin or fastener having a body portion and oppositely-arranged pointed hooks located on the same side of said body portion, one or more of said hooks being offset laterally from said body portion, substantially as described.

3. A pin or fastener having a body portion and oppositely-arranged pointed hooks on the same side of the body portion, said hooks being offset laterally in opposite directions, substantially as described.

4. A pin or fastener having a body portion and oppositely-arranged pointed hooks, located on the same side of said body portion, one of said hooks having a larger bend than the other, and one or more of said hooks being offset laterally from said body portion, substantially as described.

STEPHEN WATERMAN.

Witnesses:
   GEO. A. LITTLEFIELD,
   S. J. MURPHY.